United States Patent
Tateno

(10) Patent No.: US 8,959,456 B2
(45) Date of Patent: Feb. 17, 2015

(54) INFORMATION PROCESSING DEVICE, INFORMATION PROCESSING METHOD, AND PROGRAM FOR PROVIDING CANDIDATE INFORMATION TO A USER

(75) Inventor: Kei Tateno, Tokyo (JP)

(73) Assignee: Sony Corporation, Tokyo (JP)

( * ) Notice: Subject to any disclaimer, the term of this patent is extended or adjusted under 35 U.S.C. 154(b) by 183 days.

(21) Appl. No.: 13/617,808

(22) Filed: Sep. 14, 2012

(65) Prior Publication Data

US 2013/0246972 A1     Sep. 19, 2013

(30) Foreign Application Priority Data

Oct. 13, 2011   (JP) ................................ 2011-225477

(51) Int. Cl.
*G06F 3/0482*   (2013.01)
*G06F 17/30*   (2006.01)
*G06Q 30/02*   (2012.01)
*G06Q 50/00*   (2012.01)

(52) U.S. Cl.
CPC .............. *G06F 3/0482* (2013.01); *G06F 17/30* (2013.01); *G06Q 30/02* (2013.01); *G06Q 50/01* (2013.01)
USPC ....................................................... 715/825

(58) Field of Classification Search
CPC . G06F 3/0481; G06F 3/0482; G06F 3/04443; G06F 3/0489
USPC ........................................................ 715/825
See application file for complete search history.

(56) References Cited

U.S. PATENT DOCUMENTS

2007/0038646 A1\* 2/2007 Thota ............................ 707/100
2011/0161413 A1\* 6/2011 Cierniak et al. .............. 709/203

FOREIGN PATENT DOCUMENTS

JP        2008-283412       11/2008

OTHER PUBLICATIONS

Nozomi Kobayashi, "Opinion Mining from Web documents: Extraction and Structurization", Doctoral Dissertation, NAIST-IS-DD0461010, Mar. 23, 2007, 97 pages.

\* cited by examiner

*Primary Examiner* — Amy Ng
*Assistant Examiner* — Roland Casillas
(74) *Attorney, Agent, or Firm* — Oblon, Spivak, McClelland, Maier & Neustadt, L.L.P.

(57) ABSTRACT

An information processing device includes a comment collection unit that collects comments on a submission target that progresses with the passage of time, a comment selection unit that selects comments to be presented from collected comments to a user based on the characteristics of the user, a display control unit that controls the display of the selected comments so that the user is able to give evaluations for the selected comments, and an evaluation collection unit that collects the evaluations given by the user.

12 Claims, 9 Drawing Sheets

FIG. 8

| COMMENT | MATCHING SCORE |
|---|---|
| RYOMA'S COOL!!! | 5.11 |
| RYOMA... | 2.35 |
| SUCH AN UNCOOL RYOMA | 1.14 |
| ... | |

FIG. 9

| COMMENT | MATCHING SCORE |
|---|---|
| SO COOL | 3.15 |
| RYOMA'S COOL!!! | 3.01 |
| HE'S COOL BUT... | 0.22 |
| ... | |

FIG. 10

| COMMENT | MATCHING SCORE | SUBJECTIVITY CATEGORIZATION |
|---|---|---|
| RYOMA'S COOL!!! | 5.11 | POSITIVE |
| RYOMA... | 2.35 | NEUTRAL |
| SUCH AN UNCOOL RYOMA | 1.14 | NEGATIVE |
| ... | | |

FIG. 11

| COMMENT | MATCHING SCORE | SUBJECTIVITY CATEGORIZATION |
|---|---|---|
| SO COOL | 3.15 | POSITIVE |
| RYOMA'S COOL!!! | 3.01 | POSITIVE |
| HE'S COOL BUT... | 0.22 | NEUTRAL |
| ... | | |

INFORMATION PROCESSING DEVICE, INFORMATION PROCESSING METHOD, AND PROGRAM FOR PROVIDING CANDIDATE INFORMATION TO A USER

BACKGROUND

The present disclosure relates to an information processing device, an information processing method, and a program, and particularly relates to an information processing device, an information processing system, an information processing method, and a program that are favorably used in a case where user feedback on content, an event, or the like is collected.

In the related art, a system that collects and analyzes comments that are input by users (viewers) as feedback to a television program (for example, refer to Japanese Unexamined Patent Application Publication No. 2008-283412) has been proposed.

SUMMARY

However, there are many users that find the operation of inputting a comment using a keyboard, buttons, and the like complex and do not input a comment, meaning that feedback is not able to be obtained from such users.

It is desirable to increase feedback from users on content, an event, and the like.

An information processing device according to an embodiment of the present disclosure includes: a comment collection unit that collects comments on a submission target that progresses with the passage of time; a comment selection unit that selects comments to be presented from collected comments to a user based on the characteristics of the user; a display control unit that controls the display of the selected comments so that the user is able to give evaluations for the selected comments; and an evaluation collection unit that collects the evaluations given by the user.

The characteristics of the user may include at least one of the feature amount of comments by the user and the feature amount of comments to which the user has given affirmative evaluations, and the comment selection unit may select the comments to be presented to the user based on a result of matching the feature amount based on at least one of the feature amount of comments by the user and the feature amount of comments to which the user has given affirmative evaluations with the feature amount of the collected comments.

The feature amount of comments may include at least one of a feature amount of the writing style, the phrases that appear, the frequency with which each phrase appears, and the result of categorizing into positive comments and negative comments.

A keyword detection unit that detects keywords to be watched from the collected comments may be further included, wherein the comment selection unit may select the comments to be presented to the user from the comments including the detected keywords.

The keyword detection unit may detect the keywords based on at least one of the frequency of appearance within the collected comments, changes in the frequency of appearance, and the distribution of the frequency of appearance.

The display control unit may perform control to display, for each detected keyword, the total value of comment submissions including the keyword and affirmative evaluations on comments including the keyword.

The display control unit may perform control to distinguish and display positive comments and negative comments.

The display control unit may change the order of displaying positive comments and negative comments based on at least one of the ratio of positive comments and negative comments in the user comments and the ratio of positive comments and negative comments in the comments to which the user has given an affirmative evaluation.

An analysis unit that analyzes the collected comments and categorizes the comments into a plurality of classes including positive comments and negative comments may be further included.

The comment selection unit may prioritize and select comments of other users that are being watched by the user.

An information processing method by an information processing device according to another embodiment of the present disclosure includes: collecting comments on a submission target that progresses with the passage of time; selecting comments to be presented to a user from collected comments based on the characteristics of the user; controlling the display of the selected comments so that the user is able to give evaluations for the selected comments; and collecting the evaluations given by the user.

A program according to still another embodiment of the present disclosure causes a computer to execute: collecting comments on a submission target that progresses with the passage of time; selecting comments to be presented to a user from collected comments based on the characteristics of the user; controlling the display of the selected comments so that the user is able to give evaluations for the selected comments; and collecting the evaluations given by the user.

According to the embodiments of the present disclosure, comments on a submission target that progresses with the passage of time are collected, comments to be presented to a user from collected comments are selected based on the characteristics of the user, the display of the selected comments is controlled so that the user is able to give evaluations for the selected comments, and the evaluations given by the user are collected.

According to the embodiments of the present disclosure, feedback from the user on content, an event, or the like is able to be increased.

BRIEF DESCRIPTION OF THE DRAWINGS

FIG. 8 is a view for describing a selection method of the voting item;

FIG. 9 is another view for describing the selection method of the voting item;

FIG. 10 is a view for describing another example of the selection method of the voting item;

FIG. 11 is a view for describing still another example of the selection method of the voting item.

DETAILED DESCRIPTION OF EMBODIMENTS

Embodiments of the present disclosure (hereinafter referred to as embodiments) will be described below. Here, description will be given in the following order.
1. Embodiments
2. Modification Examples 1. Embodiments Configuration Example of Information Processing System 1

Figure 1:
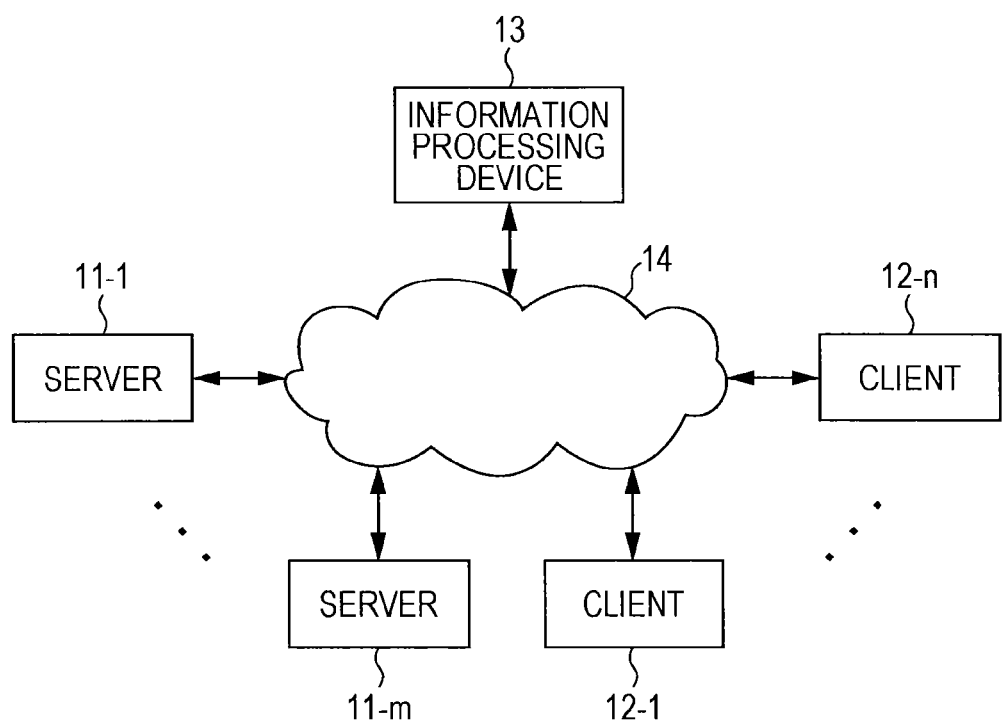
FIG. 1 is a block diagram that illustrates an embodiment of an information processing system to which embodiments of the present disclosure are applied.

FIG. 1 is a block diagram that illustrates an embodiment of an information processing system 1 to which embodiments are applied.

The information processing system 1 includes servers 11-1 to 11-$m$, clients 12-1 to 12-$n$, and an information processing device 13. The servers 11-1 to 11-$m$, the clients 12-1 to 12-$n$, and the information processing device 13 are connected to one another via a network 14 configured by, for example, the Internet or the like.

Here, in a case where the servers 11-1 to 11-$m$ do not have to be individually distinguished below, the servers will be referred to simply as a server 11. Further, in a case where the clients 12-1 to 12-$n$ do not have to be individually distinguished below, the clients will be referred to simply as a client 12.

A portion of the server 11 performs a service of transmitting a variety of content to the client 12. The content transmitted from the server 11 includes content that progresses with the passage of time such as, for example, moving image data and sound data.

Further, a portion of the server 11 provides services in which comments are able to be submitted from the client 12. Examples of such services include blogs, microblogs (for example, Twitter (registered trademark) and the like), chats, bulletin boards, and social networking services (SNS). Here, a service with which submissions from the client 12 is possible is hereinafter referred to as a submission service.

The client 12 is configured by an apparatus such as, for example, a personal computer, a mobile information terminal, a mobile phone, a television set, or a game console that is able to communicate with the server 11 and the information processing device 13 via the network 14. The user submits a comment on a predetermined submission target using the client 12 and using, for example, a submission service provided by the server 11.

Here, examples of submission targets include a variety of content that progresses with the passage of time such as video content, sound content, and television programs.

Further, the submission target content is not limited to those transmitted by the server 11 or those transmitted by the client 12. For example, it is possible for the user to watch a television program received from a device other than the server 11 through a device other than the client 12 while submitting a comment on the television program using the client 12.

Furthermore, the submission target is not limited to content, and also includes various events that progress with the passage of time such as, for example, concerts, lectures, sports matches, and product briefing sessions.

The information processing device 13 provides a comment analysis service to the client 12. The comment analysis service is a service that collects the comments that are submitted by the client 12 from the server 11, performs an analysis and aggregate calculation of the collected comments, and provides the results to the client 12, or allows the user to give evaluations to comments made by other users. Here, details of the comment analysis service will be described later with reference to FIG. 3 and the like.

[Configuration Example of Information Processing Device 13]

Figure 2:
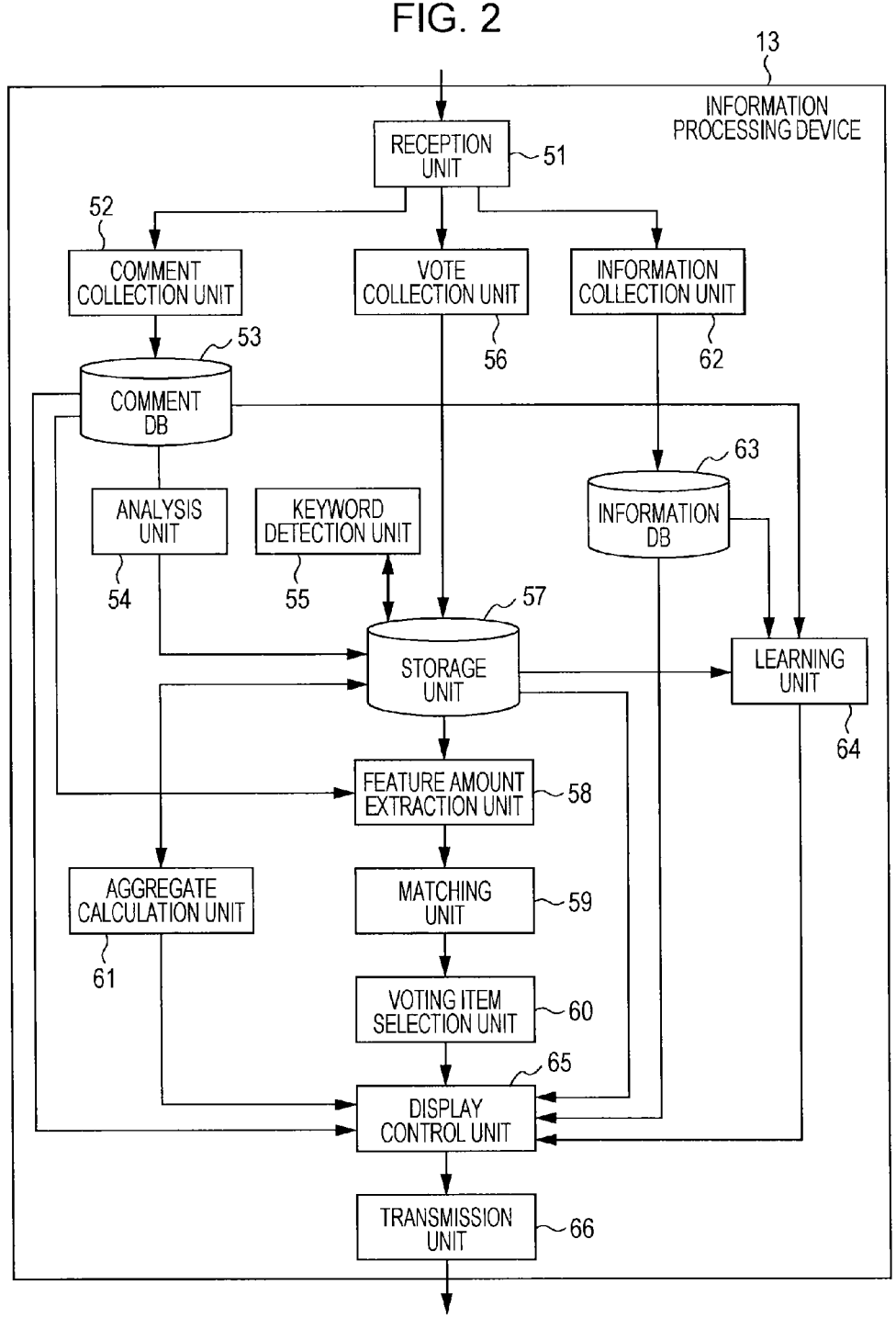
FIG. 2 is a block diagram that illustrates a configuration example of the functions of an information processing device.

FIG. 2 is a block diagram that illustrates a functional configuration example of the information processing device 13.

The information processing device 13 includes a reception unit 51, a comment collection unit 52, a comment DB (database) 53, an analysis unit 54, a keyword detection unit 55, a vote collection unit 56, a storage unit 57, a feature amount extraction unit 58, a matching unit 59, a voting item selection unit 60, an aggregate calculation unit 61, an information collection unit 62, an information DB (database) 63, a learning unit 64, a display control unit 65, and a transmission unit 66.

The reception unit 51 performs communication with the server 11 and the client 12 via the network 14, and receives the variety of data that is transmitted from the server 11 and the client 12.

The comment collection unit 52 collects that comments that are submitted to the server 11 from the client 12, from the server 11 via the network 14 and the reception unit 51. The comment collection unit 52 accumulates the collected comments in the comment DB 53.

The analysis unit 54 performs an analysis of the comments that are accumulated in the comment DB 53, and causes the storage unit 57 to store the analysis results.

The keyword detection unit 55 detects a keyword that is being watched from the collected comments based on the analysis results of the comments stored in the storage unit 57. The keyword detection unit 55 causes the detected keyword to be stored in the storage unit 57.

Here, as the keyword being watched, an example in which a trending keyword, which is a keyword that is trending among the users, is detected will be described below. Here, details of the trending keyword will be described later.

The vote collection unit 56 collects the comments submitted by the user from the client 12 via the network 14 and the reception unit 51. The vote collection unit 56 causes the results of the collected votes to be stored in the storage unit 57.

Here, as described later, by using the comment analysis service, the user is able to vote from the client 12 on comments submitted by other users.

The feature amount extraction unit 58 extracts the feature amount of comments accumulated in the comment DB 53 based on the comment analysis results stored in the storage unit 57. The feature amount extraction unit 58 generates a feature amount vector representing the extracted feature amount and supplies the feature amount vector to the matching unit 59.

For each user using the comment analysis service, the matching unit 59 performs matching of the feature amount vector representing the feature amount of comments submitted by the user in the past (hereinafter referred to as the user feature amount vector) with the feature amount vector of comments collected from the server 11 (hereinafter referred to as the comment feature vector). The matching unit 59 notifies the voting item selection unit 60 of the matching result.

The voting item selection unit 60 selects a voting item that is a comment to be posted as a voting target to each user using the comment analysis service from the collected comments based on the matching result by the matching unit 59. The voting item selection unit 60 notifies the display control unit 65 of the selected voting item.

Here, as described later, the voting item is individually selected for each user based on the characteristics of each user.

The aggregate calculation unit 61 performs an aggregate calculation of the comment submissions and votes based on the comment analysis result and the voting result stored in the storage unit 57. The aggregate calculation unit 61 notifies the display control unit 65 of the aggregate calculation result.

The information collection unit 62 collects information relating to the submission target that is the target of the comment analysis service from the server 11, and accumulates the information in the information DB 63. Further, the information collection unit 62 collects information relating to a recommended item (for example, content, a product, a service, an event, information, and the like) that is recommended to the user, and accumulates the information in the information DB 63.

The learning unit 64 learns the preferences and the like of each user based on the comment analysis results and the voting results of each user stored in the storage unit 57 and the information relating to the submission target accumulated in the information DB 63. Further, the learning unit 64 learns the recommended items to be recommended to each user based on the preferences of each user and the information relating to the recommended items accumulated in the information DB 63. The learning unit 64 supplies the learning results to the display control unit 65.

The display control unit 65 generates display control data for displaying a comment analysis page described later with reference to FIGS. 3 and 4, based on the comments accumulated in the comment DB 53, the analysis results of the comments stored in the storage unit 57, the detection results of the trending keyword, the aggregate calculation results of the comment submissions and votes aggregated in the aggregate calculation unit 61, and the information relating to the submission target accumulated in the information DB 63.

Further, the display control unit 65 generates display control data for displaying a recommended information page including the information relating to the recommended items to be recommended to each user based on the learning results by the learning unit 64.

The display control unit 65 controls the display of a comment analysis page and the recommended information page in the client 12 by transmitting the generated display control data to the client 12 via the transmission unit 66 and the network 14.

The transmission unit 66 performs communication with the server 11 and the client 12 via the network 14 and transmits a variety of data to the server 11 and the client 12.

Here, a case where the submission target that is the target of the comment analysis service is a television program will be described below as a specific example. Further, the television program that is the target of the comment analysis service will be referred to as the target program below.

[Example of Comment Analysis Page]

Figure 3:
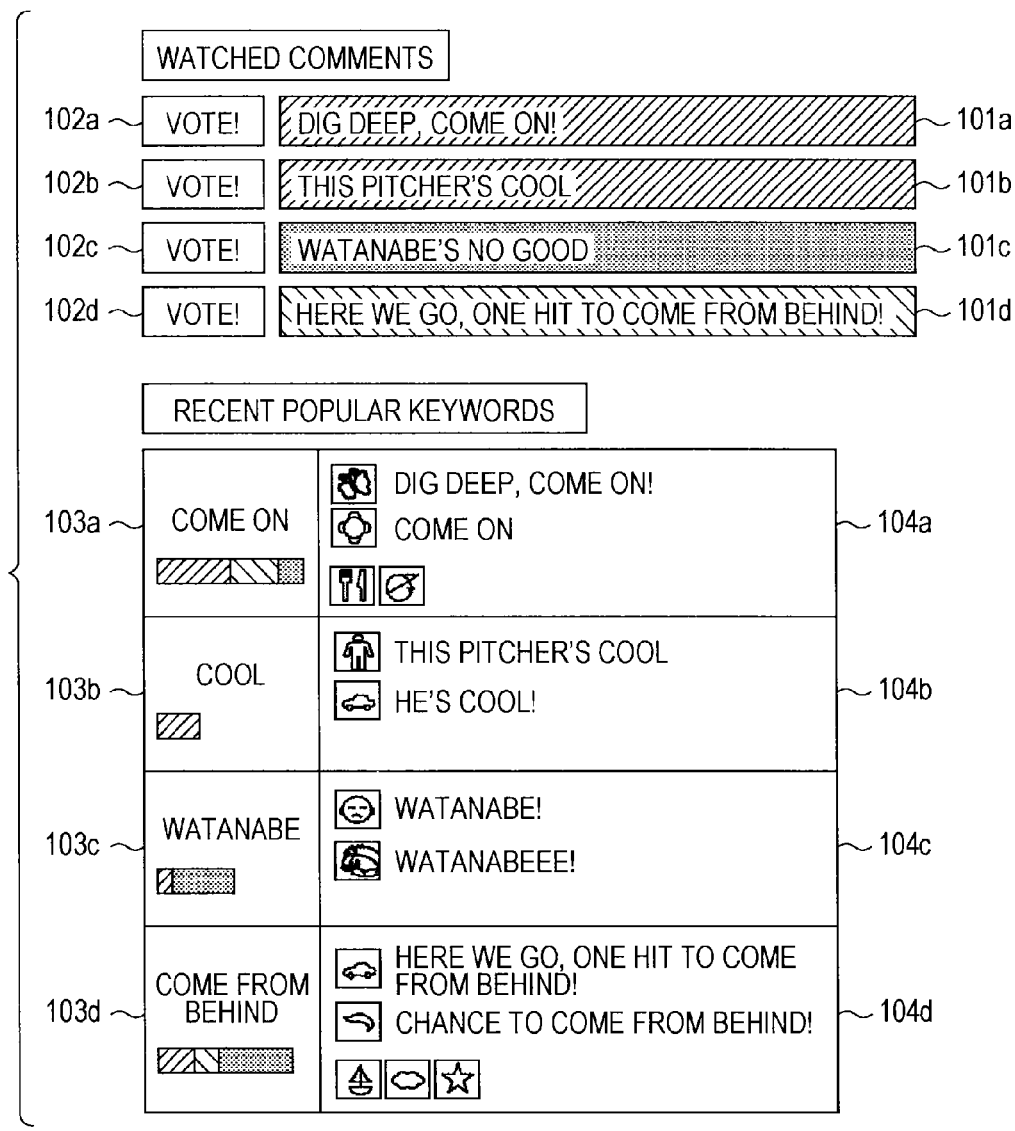
FIG. 3 is a view that illustrates an example of a comment analysis page.
Figure 4:
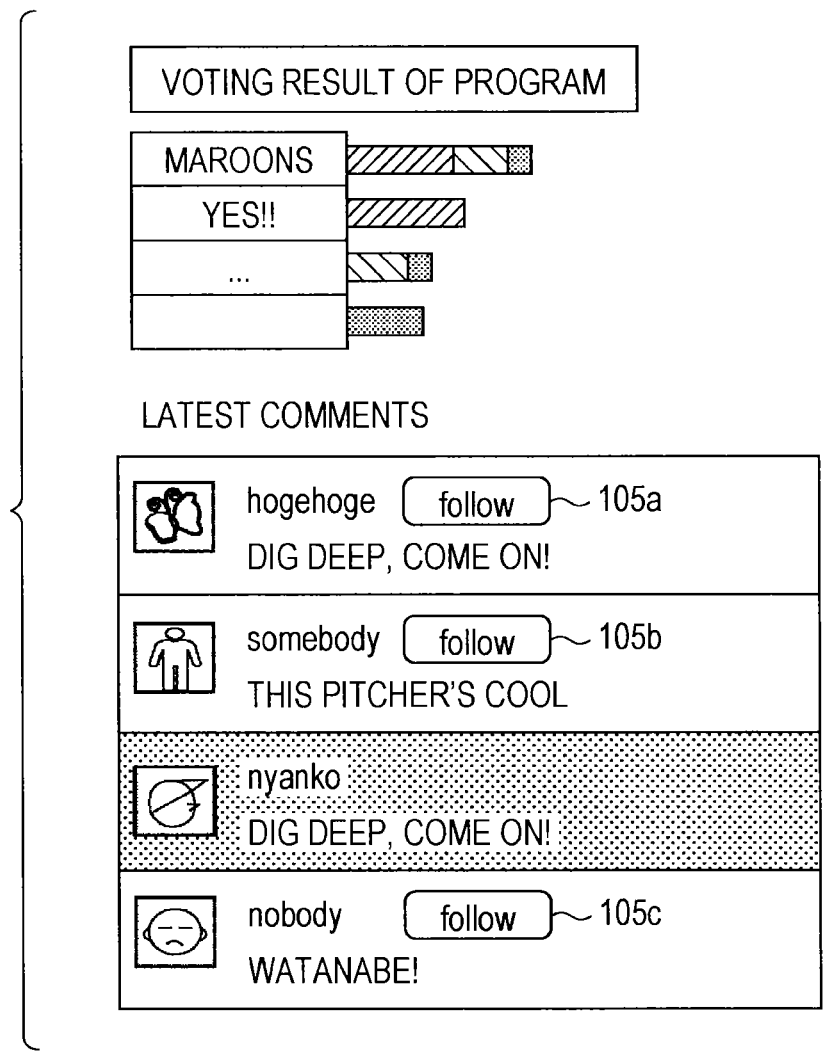
FIG. 4 is another view that illustrates an example of a comment analysis page.

FIGS. 3 and 4 illustrate an example of the comment analysis page displayed on the client 12 by using the comment analysis service. Here, one comment analysis page is configured by the screen illustrated in FIG. 3 and the screen illustrated in FIG. 4, and for example, the screen of FIG. 3 and the screen of FIG. 4 are displayed lined up vertically or horizontally, or are displayed separated into a plurality of pages.

The comment analysis page is broadly divided into a watched comments column, a recent trending keywords column, a program voting result column, and a most recent comments column.

For a predetermined number of trending keywords (for example, four), one each of voting items 101*a* to 101*d* selected from comments including the trending keywords are displayed in the watched comments column.

In the present example, "dig deep, come on!" is displayed as the voting column 101*a* for the trending keyword "come on". "this pitcher's cool" is displayed as the voting item 101*b* for the trending keyword "cool". "Watanabe's no good" is displayed as the voting item 101*c* for the trending keyword "Watanabe". "Here we go, one hit to come from behind!" is displayed as the voting item 101*d* for the trending keyword "come from behind".

Further, the voting items 101*a* to 101*d* are displayed distinguished between positive comments, negative comments, and neutral comments through, for example, the color of the frame, the background color, or the like. Here, in the present example, the voting items 101*a* and 101*b* are displayed as positive comments, the voting item 101*c* is displayed as a negative comment, and the voting item 101*d* is displayed as a neutral comment.

Furthermore, voting buttons 102*a* to 102*d* are respectively displayed to the left of the voting items 101*a* to 101*d*. The user is able to give so-called one-click individual affirmative evaluations to the voting items 101*a* to 101*d* through by pressing the voting buttons 102*a* to 102*d*.

Here, below, in a case where the voting items 101*a* to 101*d* do not have to be individually distinguished, the voting items will be referred to simply as a voting item 101, and in a case where the voting buttons 102*a* to 102*d* do not have to be individually distinguished, the voting buttons will be referred to simply as a voting button 102.

Trending keywords, an aggregate calculation result of submissions of comment including the trending keywords and votes (that is, number of affirmative evaluations), comments including the trending keywords, and the like are displayed in the recent trending keywords column.

Specifically, a predetermined number of keywords (for example, four) with the greatest trending level (described later) are respectively displayed as trending keywords in keyword columns 103*a* to 103*d*.

Further, a graph illustrating the total of submissions of comments including each trending keyword and votes (hereinafter referred to as the submission vote number) within a most recent predetermined period of time (for example, the last 10 minutes) is displayed in each keyword column 103*a* to 103*d*.

Here, the submission vote number is displayed distinguished into the three categories of positive, neutral, and negative. For example, in a predetermined most recent period of time, in a case where the number of positive comment submissions including the trending keyword "come on" is 5 and the number of votes for positive comments including "come on" is 10, the submission vote number in the positive category is 15. Similarly, in a predetermined most recent period of time, in a case where the number of neutral comment submissions including the trending keyword "come on" is 4 and the number of votes for neutral comments including "come on" is 4, the submission vote number in the neutral category is 8. Further, in a predetermined most recent period of time, in a case where the number of negative comment submissions including the trending keyword "come on" is 2 and the number of votes for negative comments including "come on" is 1, the submission vote number in the neutral category is 3.

The most recent comments out of the comments including the trending keywords out of the keyword columns 103a and 103d are displayed along with icons respectively indicating a predetermined number of users (for example, two) that submitted the comments are displayed in comment columns 104a to 104d. Further, icons that indicate the users that submitted comments including the trending keywords in the keyword columns 103a to 103d and the users that voted on the comments including the trending keywords within a predetermined most recent period of time (for example, in the last ten minutes) are displayed in the comment columns 104a to 104d.

A predetermined number of words (for example, four) included in the comments from the beginning of a television program that is the submission target to the present time in order of the submission vote number are displayed in the voting result column of the program. Further, a graph illustrating the submission vote number of the words is displayed. Here, in the graph, similarly to the graphs within the keyword columns 103a to 103d, the submission vote number is displayed distinguished into the three categories of positive, neutral, and negative.

A predetermined number of the most recent comments (for example, four) in order of the most recent submission times are displayed in the most recent comments column along with the icons and user names indicating the users that submitted the comments. For example, in the present example, the comment "dig deep, come on!" by a user with the user name "hogehoge" is displayed as the latest comment. Further, the comment "this pitcher's cool" by a user with the user name "somebody" is displayed as the second most recent comment.

Further, follow buttons 105a to 105c are displayed to the right of the user name of users, out of the users that have submitted each comment, that the user that has logged onto the comment analysis page is not following. The user is able to follow designated users by pressing the follow buttons 105a to 105c.

Furthermore, comments by users that are already followed are displayed distinguished from other comments by changing the background color or the like. In the case of the present example, the background color of the comment "dig in, come on!" by a user with the user name "nyanko" that the user that has logged into the comment analysis page is following is set to be a different color from the other comments.

Here, following is a function in which the user designates other users to watch. For example, by following a user, comments by the followed user are extracted and displayed or displayed with priority on the comment analysis page.

[Comment Analysis Service Provision Process]

Figure 5:
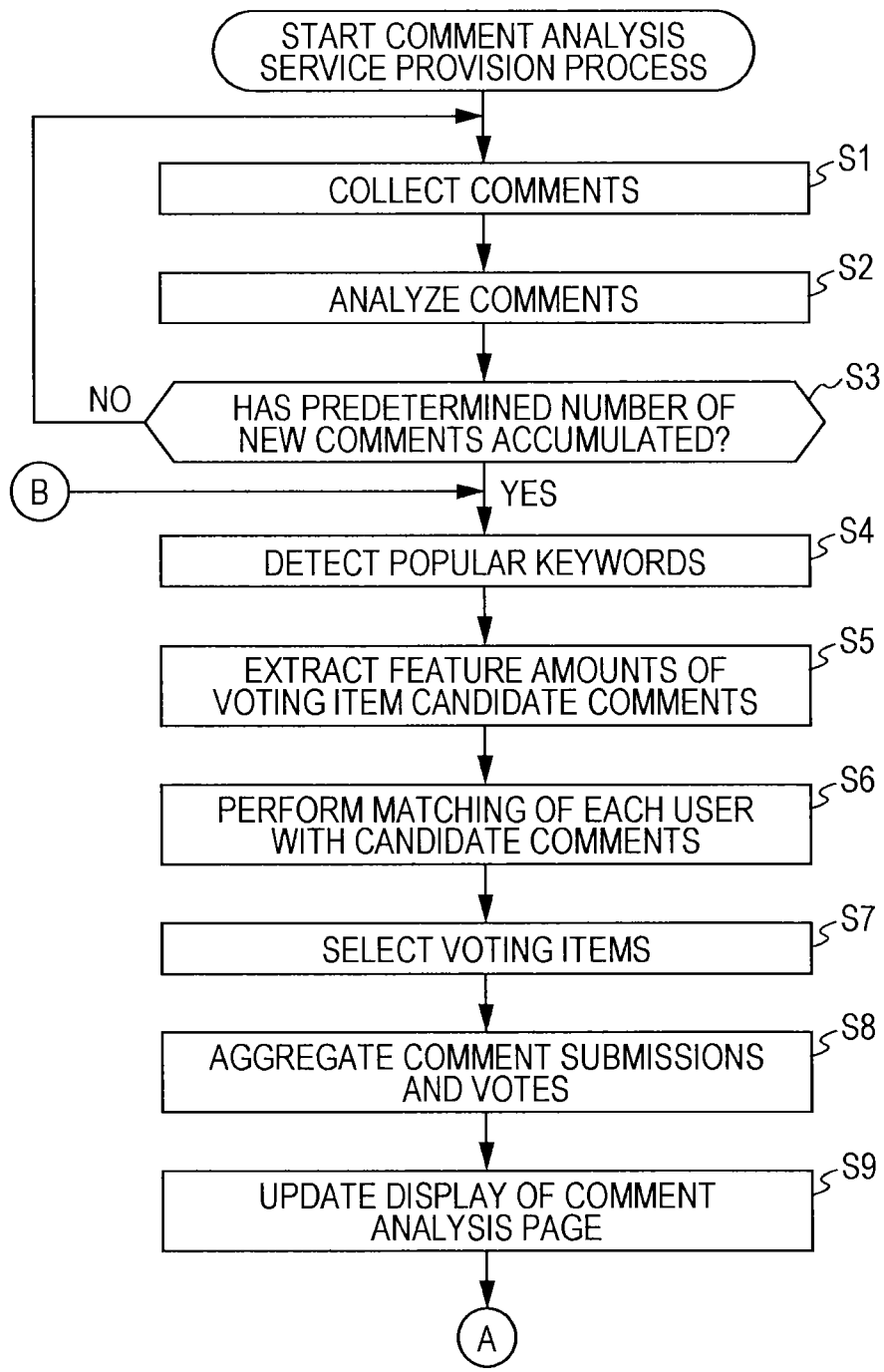
FIG. 5 is a flowchart for describing a comment analysis service provision process.
Figure 6:
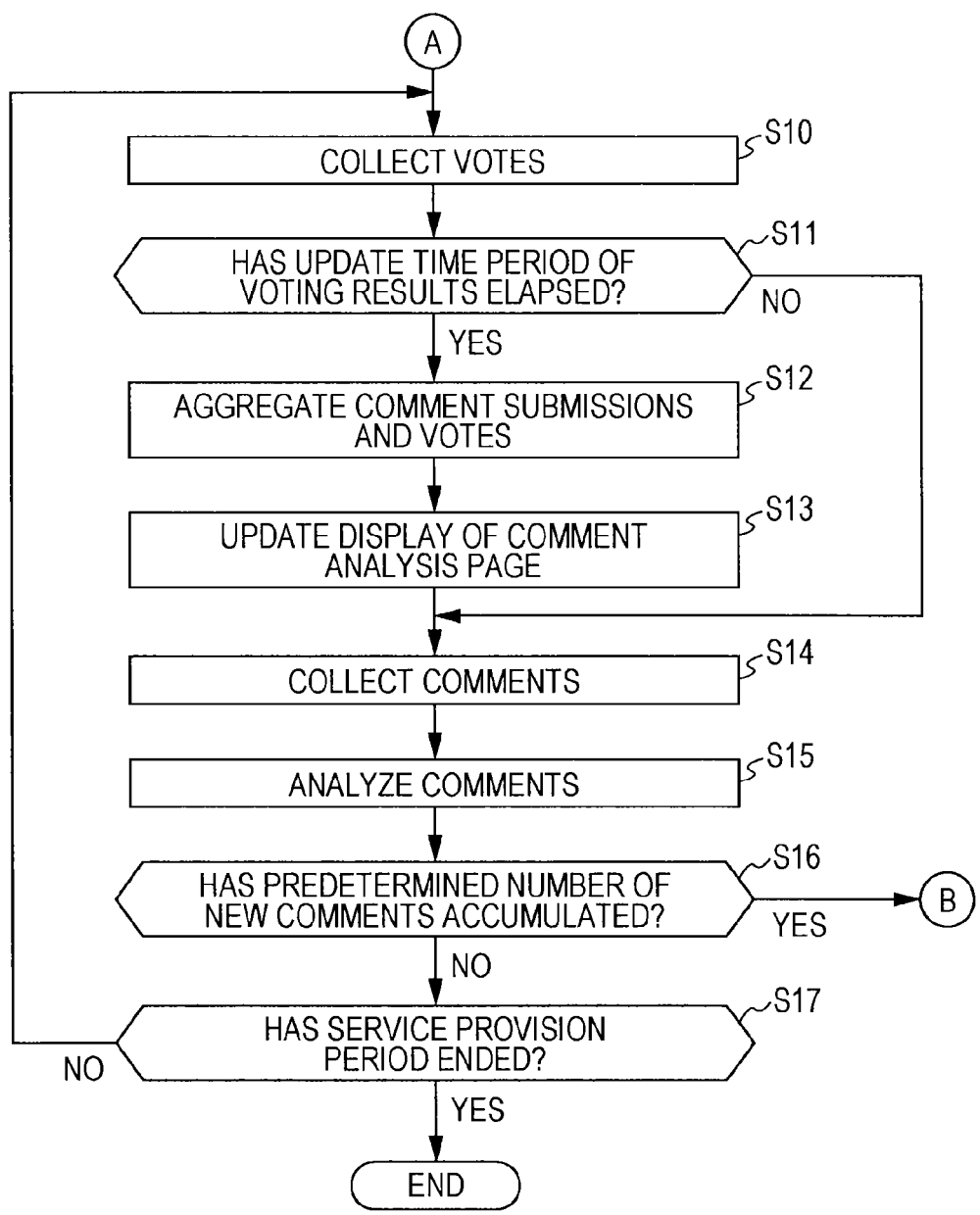
FIG. 6 is another flowchart for describing the comment analysis service provision process.

Next, the comment analysis service provision process executed by the information processing device 13 will be described with reference to the flowcharts of FIGS. 5 and 6.

In step S1, the comment collection unit 52 collects comments. Specifically, the comment collection unit 52 collects comments on a target program that is the target of the comment analysis service from the server 11 via the network 14 and the reception unit 51 using, for example, various searching techniques, crawling techniques, and the like. The comment collection unit 52 accumulates the collected comments in the comment DB 53.

In Step S2, the analysis unit 54 analyzes the comments. Specifically, for example, the analysis unit 54 breaks down each collected comment into units of words using a technique such as morphological analysis, and extracts the words included in each comment.

Further, for example, the analysis unit 54 categorizes each of the comments into the three classes of positive (affirmative) comments, negative (contradictory) comments, and neutral comments that are neither positive nor negative by performing subjective categorization of each of the comments. To that end, the technique described in ""Opinion Mining from Web Documents: Extraction and Structurization", Journal of Artificial Intelligence, Vol. 22, No. 2, pp. 227-238, 2007 by Kobayashi et al." is able to be used.

Here, each of the comments may be categorized into the two classes of positive comments and negative comments, or may be categorized into four or more classes according to the degree of positivity and the degree of negativity.

Furthermore, the analysis unit 54 causes the analysis result of each comment to be stored in the storage unit 57.

In step S3, the keyword detection unit 55 determines whether or not a predetermined number of comments have been newly accumulated. In a case where it is determined that the predetermined number of comments have not yet been accumulated, the process returns to Step S1.

Thereafter, the process of Steps S1 to S3 are repeatedly executed until it is determined in step S3 that the predetermined number of comments have been newly accumulated, and the comments on the target program are collected and accumulated in the comment DB 53.

On the other hand, in a case where it is determined in step S3 that the predetermined number of comments have been newly accumulated, the process proceeds to Step S4.

In step S4, the keyword detection unit 55 detects trending keywords. Specifically, for example, the keyword detection unit 55 divides a predetermined number of comments that have most recently been submitted (hereinafter referred to as new comments) into a predetermined number of groups in order of oldest submission times (hereinafter referred to as new groups).

Here, a case where the 50 most recently submitted new comments are divided into five groups from new groups 1 to 5 in order of oldest submission time will be described. Therefore, new comments are included ten at a time in one new group.

Next, the keyword detection unit 55 counts the appearance frequency of each word that appears in the new comments for each new group. In so doing, in a case where there are n words of words 1 to n which appear in the new comments, the respective appearance frequency of a word i (i=1 to n) in the new groups 1 to 5 is found. Further, the keyword detection unit 55 calculates an appearance total T in the new comments by calculating the appearance frequency of each word in each new group.

Furthermore, the keyword detection unit 55 investigates changes in the appearance frequency of each word in each new group. For example, the keyword detection unit 55 orders the appearance frequency of each word in order of new groups with the oldest submission times, and calculates an increase or decrease score S representing the increase or decrease inclination of the appearance frequency of each word by adding 1 in a case where the appearance frequency is increasing and subtracting 1 in a case where the appearance frequency is decreasing. For example, in a case where the appearance frequency of the word i in the new groups 1 to 5 changes from 1 to 5, 10, 10, and 7, since the appearance frequency increases twice and decreases once, the increase or decrease score of the word i is +1(=(+1)×2+(−1)×1).

Further, the keyword detection unit 55 calculates a distribution D of the appearance frequency of each word in each new group.

Furthermore, the keyword detection unit 55 calculates the trending level of each word based on, for example, the following Formula 1.

$$\text{Trending level} = \text{appearance total } T \times \text{increase or decrease score } S \times \text{distribution } D \text{ of appearance frequency} \quad (1)$$

The greater the appearance total T and the greater the distribution D of the appearance frequency (that is, the greater the increase or decrease rate of the appearance frequency of each new group) when the appearance frequency of each new group has an increasing inclination, the greater the trending level. Therefore, for example, the trending level of a word with a rapidly increasing appearance frequency is high.

Furthermore, the keyword detection unit 55 detects a predetermined number (for example, four) words in order of highest trending level as trending keywords. The keyword detection unit 55 causes the detected trending keywords to be stored in the storage unit 57.

In step S5, the feature amount extraction unit 58 extracts the feature amounts of the voting item candidate comments. Specifically, the feature amount extraction unit 58 extracts, for example, a comment including a trending keyword from the new comments as a voting item candidate comment. Further, the feature amount extraction unit 58 selects one user from the users using the comment analysis service, and sets the user to be the watched user. Furthermore, the feature amount extraction unit 58 calculates a comment feature amount vector representing the feature amount of each candidate comment of the watched user.

Figure 7:
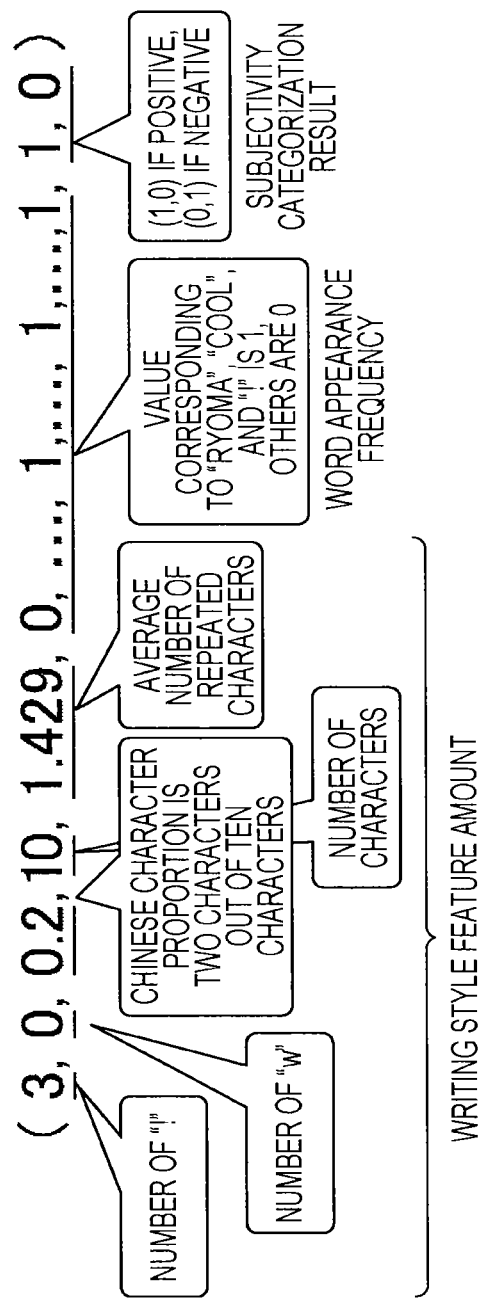
FIG. 7 is a view that illustrates an example of a comment feature amount vector.

FIG. 7 illustrates an example of the comment feature vector for the comment "Ryoma's cool!!!". The comment feature amount vector includes, for example, the writing style feature amount, the word appearance frequency, the subjective categorization result, and the like as the feature amount.

The writing style feature amount represents the characteristics of the writing style of a comment, and for example, includes a feature amount based on computational stylistics or the like. In the present example, the number of "!", the number of "w", the proportion of Chinese character, the number of characters, and the average number of character repetitions within the comment are included. Here, the number of "!" and the number of "w" are counted without distinguishing between half-size characters and full-size characters.

For example, since "!" appears three times in "Ryoma's cool!!!", the number of "!" is set to 3. On the other hand, since "w" does not appear at all, the number of "w" is set to 0.

Further, since the number of characters in "Ryoma's cool!!!" in Japanese is 10 characters, two of which are Chinese character, the Chinese character proportion is set to 0.2 and the number of characters is set to 10.

Furthermore, in a case where every new character written in a Japanese comment "Ryo-ma, ka-k-ko-i-i!!! (Ryoma's cool!!!)" is punctuated, the punctuations are /Ryo/ma/ka/k/ko/i-i/!-!-!/. Furthermore, if the number of characters in each division is counted, the numbers are /1/1/1/1/1/2/3/. Furthermore, the average number of characters in each division is (1+1+1+1+1+2+3)/7=1.429. 1.429 is set as the average number of repeated characters.

Further, the word appearance frequency indicates the number of times that each word appears in a comment, for example, and the number of times that all words recorded in a predetermined dictionary are repeated is sorted in a predetermined order. Here, 0 is set for words that do appear in the comment.

Furthermore, in the case of a positive comment, (1,0) is set as the subjective categorization result, and (0,1) is set in the case of a negative comment.

Furthermore, the feature amount extraction unit 58 calculates the comment feature amount vector representing the feature amount of each candidate comment for each user by setting all users using the comment analysis service to be the watched user in order and performing processing. The feature amount extraction unit 58 supplies the calculated comment feature amount vector to the matching unit 59.

In step S6, the matching unit 59 performs matching of each user with the candidate comments. Specifically, the matching unit 59 selects one of the users using the comment analysis service and sets the user to be the watched user. Furthermore, the matching unit 59 performs matching of the user feature amount vector that is the average vector of the feature amount vectors of comments submitted in the past by the watched user with the comment feature amount vector of each candidate comment.

For example, in a case where each feature amount of a user feature amount vector u is $u_i$ (i=1 to m), each feature amount of a comment feature amount vector c is $c_i$ (i=1 to m), and each weight of a weight vector w is $w_i$ (i=1 to m), a matching score ms representing the similarity between the user feature amount vector u and the comment feature amount vector c is calculated by the following Formula 2.

$$ms = \frac{\sum_{i=1}^{m} w_i u_i c_i}{\sqrt{\sum_{i}^{m} u_i^2} \sqrt{\sum_{i}^{m} c_i^2}} \quad (2)$$

Furthermore, the matching unit 59 calculates the matching score ms between the user feature amount vector u of each user and the comment feature amount vector of each candidate comment by setting all users using the comment analysis service to be the watched user in order and performing processing. The matching unit 59 supplies the calculated matching score ms to the voting item selecting unit 60.

Here, the matching technique used here is not limited to the example described above, and an arbitrary technique is able to be adopted.

Further, the user feature amount vector may be calculated in advance, for example, or may be calculated every time matching is performed.

Furthermore, the range of past comments by the watched user which are the calculation target of the user feature amount vector is able to be set arbitrarily. For example, comments submitted within a predetermined most recent period of time (for example, one month) may be the target, or comments submitted on programs of the same genre as the target program may be the target.

In step S7, the voting item selection unit 60 selects the voting item. Specifically, the voting item selection unit 60 selects one of the users using the comment analysis service and sets the user to be the watched user. Furthermore, for each trending keyword, the voting item selection unit 60 selects one comment with the highest matching score ms with respect to the watched users from the candidate comments including each trending keyword, and selects each comment as the voting item.

For example, in a case where the matching score ms of a candidate comment including the trending keyword "Ryoma" is calculated as illustrated in FIG. 8, "Ryoma's cool!!!" which has the highest matching score ms is selected as the voting item. Similarly, for example, in a case where the matching score ms of the candidate comment including the trending keyword "cool" is calculated as illustrated in FIG. 9, "he's cool" which has the highest matching score ms is selected as the voting item.

Therefore, the voting item with respect to the watched user is selected from the candidate comments including each trending keyword based on the characteristics of the watched user.

Specifically, since the writing style feature amount is included in the feature amount vector used in the calculation of the matching score ms, comments with writing styles that are close to the writing style of the watched user are prioritized and selected as the voting item. Further, since the feature amount vector includes word appearance frequencies, comments containing words that are often used by the watched user are prioritized and selected as the voting item. Furthermore, since the feature amount vector includes the subjective categorization results, for a watched user with a high proportion of positive comment submissions, positive comments are prioritized and selected as the voting item. Conversely, for a watched user with a high proportion of negative comment submissions, negative comments are prioritized and selected as the voting item.

Therefore, comments that are similar in feel to comments that the watched user submits and comments with which the watched user feels familiar tend to be selected as the voting item.

By the above, the probability that the watched user agrees with the selected voting item and presses the voting button 102 on the comment analysis page increases. As a result, feedback from the watched user on the target program is able to be increased.

Furthermore, the voting item selection unit 60 individually selects the voting item for each user by setting all users using the comment analysis service to be the watched user and performing processing. The voting item selection unit 60 notifies the display control unit 65 of the selected voting items.

In step S8, the aggregate calculation unit 61 performs an aggregate calculation of the number of comment submissions and votes. Specifically, the aggregate calculation unit 61 performs an aggregate calculation by dividing, for each of the words that appear in comments collected thus far, the number of comment submission including each word into positive comments, negative comments, and neutral comments based on the analysis result of the comments stored in the storage unit 57. For example, in a case where an aggregate calculation of the submissions of comments including "Ryoma" is performed, the number of positive comment submissions including "Ryoma", the number of negative comment submissions including "Ryoma", and the number of neutral comment submissions including "Ryoma" are ascertained.

Further, the aggregate calculation unit 61 performs an aggregate calculation by dividing, for each of the words that appear in comments collected thus far, the number of votes for comments including each word (that is, number of affirmative evaluations) into positive comments, negative comments, and neutral comments based on the analysis result of the comments stored in the storage unit 57. For example, in a case where an aggregate calculation of the votes for comments including "Ryoma" is performed, the number of votes for positive comments including "Ryoma", the number of votes for negative comments including "Ryoma", and the number of votes for neutral comments including "Ryoma" are ascertained.

Furthermore, the aggregate calculation unit 61 performs an aggregate calculation by dividing, for each of the words that appear in comments collected thus far, the total number of submissions and votes including each word (submission vote number) into positive comments, negative comments, and neutral comments. For example, in a case where an aggregate calculation of the submission vote number for comments including "Ryoma" is performed, the submission vote number for positive comments including "Ryoma", the submission vote number for negative comments including "Ryoma", and the submission vote number for neutral comments including "Ryoma" are ascertained.

Furthermore, the aggregate calculation unit 61 notifies the display control unit 65 of the aggregate calculation results.

In step S9, the display control unit 65 updates the display of the comment analysis page. Specifically, the display control unit 65 generates display control data for displaying the comment analysis page described above with reference to FIGS. 3 and 4 based on the analysis results of the comments accumulated in the comment DB 53 and the comments stored in the storage unit 57, the detection results of the trending keywords, the aggregate calculation results of the number of submissions and votes on comments calculated by the aggregate calculation unit 61, and the information relating to the target program accumulated in the information DB 63.

Here, since the voting item differs for each user, a portion of the display control data differs for each user (client 12).

Furthermore, the display control unit 65 transmits the generated display control data to each client 12 via the transmission unit 66 and the network 14.

Each client 12 receiving the display control data displays a comment analysis page based on the received display control data. As a result, the display content of the comment analysis page is updated.

In step S10, the vote collection unit 56 collects votes. Specifically, in a case where the vote button 102 is pressed on the comment analysis page displayed by each client 12, the client 12 transmits information indicating the vote content to the information processing device 13 via the network 14. The information indicating the vote content includes, for example, information indicating the voted comment (voting item), the voting user, and the like.

The vote collection unit 56 of the information processing device 13 receives the information indicating the vote content via the reception unit 51.

In step S11, the aggregate calculation unit 61 determines whether or not an update period of the voting results has elapsed. In a case where it is determined that the update period of the voting results has elapsed, the process proceeds to step S12.

In step S12, similarly to the process of step S8, an aggregate calculation is performed the number of comment submission and votes. Furthermore, the cote collection unit 56 causes the result of the votes collected from each client 12 to be stored in the storage unit 57.

In step S13, similarly to the process of step S9, the display of the comment analysis page is updated. In so doing, for example, the display of portions excluding the watched comments column of the comment analysis page is updated for each client 12.

The process then proceeds to step S14.

On the other hand, in a case where it is determined in step S11 that the update period of the voting results has not elapsed, the processes of steps S12 and S13 are skipped, and the process proceeds to step S14.

In step S14, similarly to the process of step S1, comments are collected.

In step S15, similarly to the process of step S2, comments are analyzed.

In step S16, similarly to the process of step S3, it is determined whether or not a predetermined number of comments have been newly accumulated, and in a case where it is determined that the predetermined number of comments have not yet been newly accumulated, the process proceeds to step S17.

In step S17, the vote collection unit 56 determines whether or not the service provision period has ended. In a case where it is determined that the service provision period has not ended, the process returns to step S10.

The processes of steps S10 to S17 are then repeatedly executed until it is determined in step S16 that the predetermined number of comments have been newly accumulated or it is determined in step S17 that the service provision period has ended. In so doing, comments and votes on comments are collected, an aggregate calculation of the number of comment submissions and votes is performed for each predetermined update period, and the display of the comment analysis page is updated.

On the other hand, in a case where it is determined in step S16 that the predetermined number of comments have been newly accumulated, the process returns to step S4.

The processes of steps S4 to S17 are then repeatedly executed until it is determined in step S17 that the service provision period has ended. In so doing, comments and votes for comments are collected, an aggregate calculation of the number of comment submissions and votes is performed for each predetermined update period, and the display of the comment analysis page is updated. Further, every time the predetermined number of comments are newly collected, the trending keywords are updated, the voting items for each user are updated, and the display of the comment analysis page is updated.

On the other hand, in a case where is determined in step S17 that the service provision period has ended, the comment analysis service provision process ends. Here, the service provision period is set, for example, to the end of the broadcast of the target program or until a predetermined period elapses from the end of the broadcast.

By the above, an analysis result of comments on the target program is able to be provided to the user.

Further, a portion of the comments submitted from each user is posted to the user as voting items, and the user is able to vote on a voting item through a simple operation to easily return feedback on the target program. Furthermore, the voting items are individually selected according to the characteristics of each user from the comments including keywords that are trending among users. Therefore, the probability of each user voting is higher, and feedback from each user on the target program is able to be increased.

Furthermore, for example, comments voted for by the user are able to be treated similarly to comments personally submitted by the user, which are able to be used to search for similar users and in various recommended processes.

For example, users that are similar to the user A are able to be searched for based on comments voted for by a given user A. Specifically, users that submitted comments that are similar to the comments voted for by the user A or users that voted for comments that are similar to the comments voted for by the user A are able to be detected as users that are similar to the user A through techniques such as, for example, a vector space method using keywords included in each comment.

Further, mutual relationships between users are able to be constructed based on relationship between users that vote and the user that submitted the voted comment, which is able to be used for user recommendations and the like. For example, in a case where the user A votes for a comment by a user B and the user B votes for a comment by a user C, the user C is able to be recommended to the user A.

Furthermore, in a case where, for example, the user A votes for a positive comment, recommended items for the user A is able to be searched for based on keywords included in the comment, which is able to be recommended to the user A.

2. Modification Example

Modification examples of the embodiments will be described below.

Modification Example 1

Modification Example of Submission Target

While an example in which collection and analysis of comments mainly on a television program are performed has been shown in the description above, the embodiments are also able to perform collection and analysis of comments on a submission target other than television programs. For example, a variety of content that progresses with the passage of time such as moving image content other than television programs (for example, movies and the like) and sound content (for example, radio programs, music, and the like), various events that progress with the passage of time such as concerts, lectures, sports matches, and product briefing sessions, and the like are able to be assumed as the submission target.

Further, the content may be distributed in real time such as with television broadcasts or may be distributed in non-real time such as with a video distribution service.

Modification Example 2

Modification Example of Evaluation of Voting Items

While an example of posting voting items so that affirmative evaluations are able to be given using the voting button 102 has been shown in the description above, affirmative evaluations and contradictory evaluations may be given to each voting item by further providing a voting button for giving a contradictory evaluation.

In such a case, for example, in a case where voting to give a contradictory evaluation to a positive comment is performed, the vote is able to be treated as one vote to a negative comment in the aggregate calculation of the votes. Similarly, in a case where voting to give a contradictory evaluation to a negative comment is performed, the vote is able to be treated as one vote to a positive comment in the aggregate calculation of the votes.

Further, for example, only a voting button to give a contradictory evaluation may be provided without providing a voting button to give an affirmative evaluation. Furthermore, for each voting item, three or more levels of evaluations may be given using a slider or the number of stars, or an evaluation value such as a score may be able to be input.

Modification Example 3

Modification Example of Comment Feature Amount Used in Selection of Voting Item

While voting items are selected using the comment feature amount of the watched user (in more detail, the feature amount of comments submitted by the watched user in the past) in the description above, for example, the feature amount of a comment to which the watched user has an affirmative evaluation may be used. In such a case, both of the feature amount of comments by the watched user and the feature amount of comments to which the watched user has an affirmative evaluation may be used, or only one may be used.

Modification Example 4

Modification Example of Selection Standard of Voting Items

While an example in which the comment including a trending keyword with the greatest matching score is selected as the voting item for each trending keyword has been shown in the description above, the voting items may be selected based on other standards.

For example, one each of a positive comment and a negative comment including a trending keyword with the greatest matching score may be selected as the voting items.

Here, specific examples of such a case will be described with reference to FIGS. 10 and 11. Here, FIGS. 10 and 11 are respectively views in which the results of a subjective categorization of each comment are added to FIGS. 8 and 9.

For example, based on FIG. 10, the two comments of the positive comment "Ryoma's cool!!!" with the greatest matching score and the negative comment "such an uncool Ryoma" with the greatest matching score are selected from comments including the trending keyword "Ryoma" to be the voting items.

Further, for example, based on FIG. 11, the positive comment "he's cool" with the greatest matching score is selected from comments including the trending keyword "cool" to be the voting item. In such a case, since there are no negative comments including the word "cool", there is only one selected voting item.

Further, for example, the voting items may be selected from either positive comments or negative comments.

For example, in a case where the voting items are only selected from positive comments, based on FIG. 10, the positive comment "Ryoma's cool!!!" with the greatest matching score is selected from comments including the trending keyword "Ryoma" to be the voting item. Further, based on FIG. 11, the positive comment "he's cool" with the greatest matching score is selected from comments including the trending keyword "cool" to be the voting item.

Further, for example, in a case where the voting items are only selected from negative comments, based on FIG. 10, the negative comment "such an uncool Ryoma ww" with the greatest matching score is selected from comments including the trending keyword "Ryoma" to be the voting item. Here, since there are no negative comments for the trending keyword "cool", no voting item is selected.

Furthermore, for example, comments by submitters followed by the user is prioritized and selected as voting items by adding a predetermined constant or multiplying a predetermined coefficient greater than 1 to comments by submitters that the user is following (watching).

Modification Example 5

Modification Example of Display Order of Voting Items

For the display order of voting items in the watched comments column of the comment analysis page of FIG. 3, for example, setting the voting items in order of the highest trending level of trending keywords included in the voting items is able to be considered. Here, in such a case, voting items including a plurality of trending keywords may add the trending level of each trending keyword.

Further, the order of displaying positive comments and negative comments may be changed based on the preferences of the user.

For example, positive comments may be displayed first in a case where the proportion of positive comments is high among contents submitted by the user in the past, and negative comments may be displayed first in a case where the proportion of negative comments is high. Alternatively, for example, positive comments may be displayed first in a case where the proportion of positive comments is high among comments to which the user has given affirmative evaluations in the past, and negative comments may be displayed first in a case where the proportion of negative comments is high. Alternatively, in the aggregate calculation result of both comments submitted by the user in the past and comments to which affirmative evaluations were given in the past, positive comments may be displayed first in a case where the proportion of positive comments is high and negative comments may be displayed first in a case where the proportion of negative comments is high.

Modification Example 6

Modification Example of User Characteristics Used in Selection of Voting Items

The user characteristics used in the selection of the voting items is not limited to the example described above, and a portion of the characteristics described above is able to be used or other characteristics are able to be used.

Further, the user writing style feature amount used in the selection of the voting items is not limited to the example described above either, and a portion of the feature amount described is able to be used or other feature amounts are able to be used.

Furthermore, since the writing style feature amount differs according to the type of language, the writing style feature amount to be used may be changed according to the type of language used in a comment.

Modification Example 7

Modification Example of Keywords

The detection method of trending keywords is not limited to the example described above. For example, trending keywords may be detected based on any one or two of the appearance frequency, changes in the appearance frequency, and the distribution of the appearance frequency of each word.

Further, keywords other than trending keywords may be detected as watched keywords and used in the selection of voting items.

For example, the service provider may set keyword candidates in advance, and keywords included in the collected comments may be detected as watched keywords from the candidates and used in the selection of voting items. In so doing, for example, the service provider is able to investigate the preferences of a user with respect to desired keywords, or the like.

Modification Example 8

Modification Example in Units of Comment Analysis and Units of Keyword Detection Units of comment analysis and units of watched keyword detection are not limited to the word level, and may be set, for example, to the level of words and phrases of a unit larger than words (for example, idioms, phrases, and the like).

[Configuration Example of Computer]

The series of processes described above are able to be executed through hardware or through software. In a case where the series of process is executed by software, a program configuring the software is installed on a computer. Here, examples of the computer include a computer built into dedicated hardware, a generic personal computer that is able to execute various functions by installing various programs, and the like.

Figure 12:
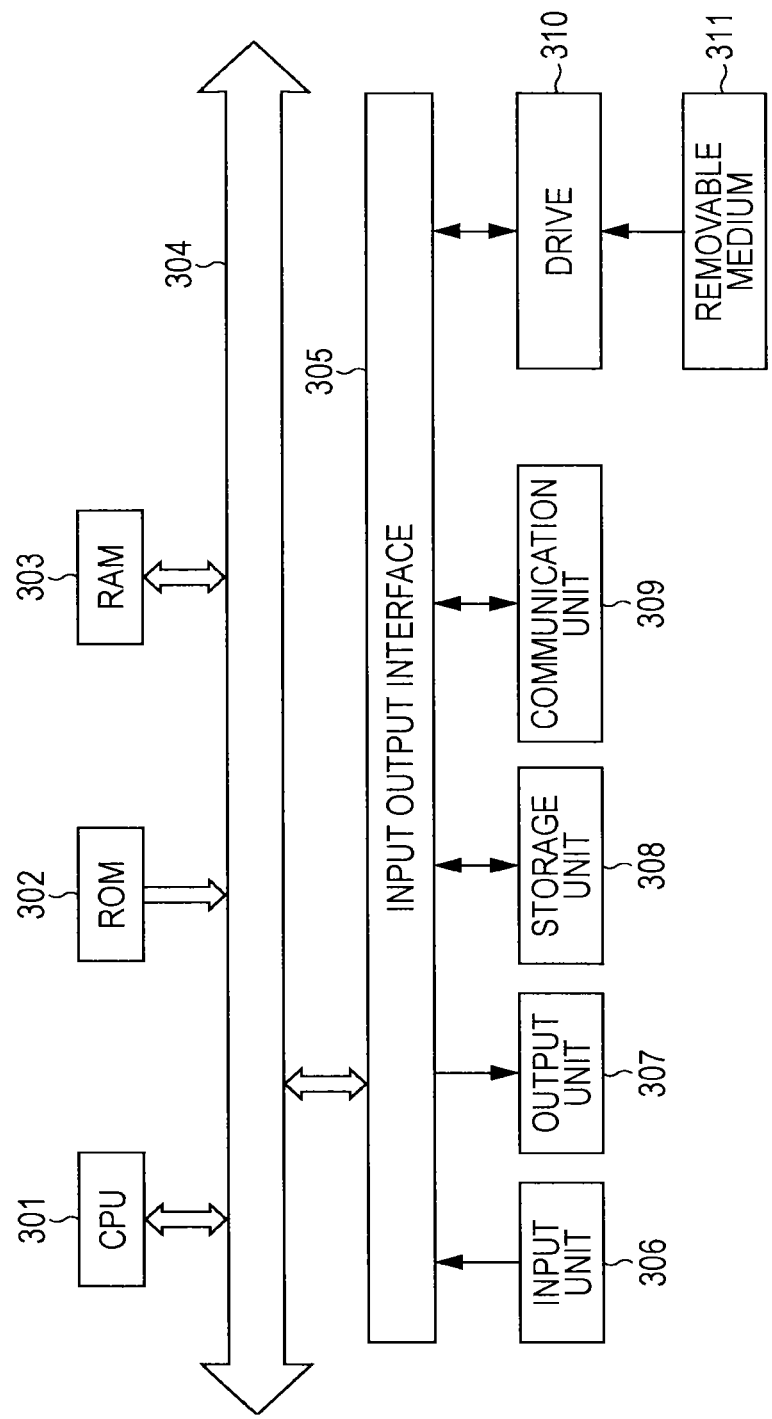
FIG. 12 is a block diagram that illustrates a configuration example of a computer.

FIG. 12 is a block diagram that illustrates a configuration example of the hardware of a computer executing the series of processes described above through a program.

In the computer, a CPU (Central Processing Unit) 301, a ROM (Read Only Memory) 302, and a RAM (Random Access Memory) 303 are connected to one another by a bus 304.

An input output interface 305 is further connected to the bus 304. An input unit 306, an output unit 307, a storage unit 308, a communication unit 309, and a drive 310 are connected to the input output interface 305.

The input unit 306 is formed of a keyboard, a mouse, a microphone, and the like. The output unit 307 is formed of a display, a speaker, and the like. The storage unit 308 is formed of a hard disk, a non-volatile memory, or the like. The communication unit 309 is formed of a network interface or the like. The drive 310 drives a removable medium 311 formed of a magnetic disk, an optical disc, a magneto-optical disc, a semiconductor memory, or the like.

In a computer configured as described above, the series of processes described above is performed by the CPU 301 loading and executing the program stored in the storage unit 308, for example, on the RAM 303 via the input output interface 305 and the bus 304.

The program that the computer (CPU 301) executes is able to be provided by recording on the removable medium 311 as a packaged medium or the like, for example. Further, the program is able to be provided via a wired or wireless transmission medium such as a local area network, the Internet, or a digital satellite broadcast.

In the computer, the program is able to be installed in the storage unit 308 via the input output interface 305 by mounting the removable medium 311 on the drive 310. Further, the program is able to be received by the communication unit 309 via a wired or wireless transmission medium and installed in the storage unit 308. Otherwise, the program is able to be installed in the ROM 302 or the storage unit 308 in advance.

Here, the program that the computer executes may be a program in which processes are performed in time series along the order described in the present specification, or may be a program in which processes are performed in parallel or at designated timings such as when a call is made.

Further, in the present specification, a system refers to a collection of a plurality of constituent elements (device, modules (parts), and the like), and it does not matter whether or not all constituent elements are in the same housing. Therefore, a plurality of devices that are stored in separate housing and that are connected via a network and one device in which a plurality of modules are stored in one housing are both systems.

Furthermore, the embodiments of the present disclosure are not limited to the embodiments described above, and various modifications are possible without departing from the gist of the embodiments of the present disclosure.

For example, the embodiments of the present disclosure may be configured through cloud computing in which one function is shared and jointly processed by a plurality of devices via a network.

Further, each step described in the flowcharts described above may be executed by one device or may be executed by being shared between a plurality of devices.

Furthermore, in a case where a plurality of processes are included in one step, the plurality of processes included in one step may be executed by one device or may be executed by being shared between a plurality of devices.

Further, for example, the present disclosure is able to adopt the following configuration.

(1)

An information processing device including: a comment collection unit that collects comments on a submission target that progresses with the passage of time; a comment selection unit that selects comments to be presented from collected comments to a user based on the characteristics of the user; a display control unit that controls the display of the selected comments so that the user is able to give evaluations for the selected comments; and an evaluation collection unit that collects the evaluations given by the user.

(2)

The information processing device according to (1), wherein the characteristics of the user include at least one of the feature amount of comments by the user and the feature amount of comments to which the user has given affirmative evaluations, and the comment selection unit selects the comments to be presented to the user based on the result of matching the feature amount based on at least one of the feature amount of comments by the user and the feature amount of comments to which the user has given affirmative evaluations with the feature amount of the collected comments.

(3)

The information processing device according to (2), wherein the feature amount of comments includes at least one of the feature amount of the writing style, phrases that appear, the frequency with which each phrase appears, and the result of categorizing into positive comments and negative comments.

(4)

The information processing device according to any one of (1) to (3), further including: a keyword detection unit that detects keywords to be watched from the collected comments, wherein the comment selection unit selects the comments to be presented to the user from the comments including the detected keywords.

(5)

The information processing device according to (4), wherein the keyword detection unit detects the keywords based on at least one of the frequency of appearance within the collected comments, changes in the frequency of appearance, and the distribution of the frequency of appearance.

(6)

The information processing device according to (4) or (5), wherein the display control unit performs control to display, for each detected keyword, the total value of comment submissions including the keyword and affirmative evaluations on comments including the keyword.

(7)

The information processing device according to any one of (1) to (6), wherein the display control unit performs control to distinguish and display positive comments and negative comments.

(8)

The information processing device according to (7), wherein the display control unit changes the order of displaying positive comments and negative comments based on at least one of the ratio of positive comments and negative comments in the user comments and the ratio of positive comments and negative comments in the comments to which the user has given an affirmative evaluation.

(9)

The information processing device according to any one of (1) to (8), further including: an analysis unit that analyzes the collected comments and categorizes the comments into a plurality of classes including positive comments and negative comments.

(10)

The information processing device according to (1) to (9), wherein the comment selection unit prioritizes and selects comments of other users that are being watched by the user.

(11)

An information processing method by an information processing device, the method including: collecting comments on a submission target that progresses with the passage of time; selecting comments to be presented to a user from collected comments based on the characteristics of the user; controlling the display of the selected comments so that the user is able to give evaluations for the selected comments; and collecting the evaluations given by the user.

(12)

A program causing a computer to execute: collecting comments on a submission target that progresses with the passage of time; selecting comments to be presented to a user from collected comments based on the characteristics of the user; controlling the display of the selected comments so that the user is able to give evaluations for the selected comments; and collecting the evaluations given by the user.

The present disclosure contains subject matter related to that disclosed in Japanese Priority Patent Application JP 2011-225477 filed in the Japan Patent Office on Oct. 13, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device comprising:
comment collection circuitry that collects comments on a submission target that progresses with a passage of time;
comment selection circuitry that selects comments to be presented from the collected comments to a user based on characteristics of the user, wherein:
the characteristics of the user include at least one of a feature amount of comments by the user and a feature amount of comments to which the user has given affirmative evaluations;
the feature amount of comments is represented as a comment feature amount vector;
each of the collected comments has a corresponding comment feature amount vector; and
the feature amount of comments includes at least two of a feature amount of a writing style, phrases that appear, a frequency with which each phrase appears, and a result of categorizing into positive comments and negative comments;
display control circuitry that controls a display of the selected comments so that the user is able to give evaluations for the selected comments; and
evaluation collection circuitry that collects the evaluations given by the user.

2. The information processing device according to claim 1, wherein the comment selection circuitry selects the comments to be presented to the user based on a result of matching the feature amount based on the at least one of the feature amount of comments by the user and the feature amount of comments to which the user has given affirmative evaluations with the feature amount of the collected comments.

3. The information processing device according to claim 1, further comprising: keyword detection circuitry that detects detect keywords to be watched from the collected comments, wherein the comment selection circuitry selects the comments to be presented to the user from the comments including the detected keywords.

4. The information processing device according to claim 3, wherein the keyword detection circuitry detects the keywords based on at least one of a frequency of appearance within the collected comments, changes in the frequency of appearance, and a distribution of the frequency of appearance.

5. The information processing device according to claim 3, wherein the display control circuitry performs control to display, for each detected keyword, a total value of comment submissions including the keyword and affirmative evaluations on comments including the keyword.

6. The information processing device according to claim 1, wherein the display control circuitry performs control to distinguish and display positive comments and negative comments.

7. The information processing device according to claim 6, wherein the display control circuitry changes an order of displaying positive comments and negative comments based on at least one of a ratio of positive comments and negative comments in the user comments and a ratio of positive comments and negative comments in the comments to which the user has given an affirmative evaluation.

8. The information processing device according to claim 6, wherein further comprising: analysis circuitry that analyzes the collected comments and categorize the comments into a plurality of classes including positive comments and negative comments.

9. The information processing device according to claim 1, wherein the comment selection circuitry prioritizes and selects comments of other users that are being watched by the user.

10. The information processing device according to claim 1, wherein the feature amount of comments includes all of the feature amount of the writing style, the phrases that appear, the frequency with which each phrase appears, and the result of categorizing into positive comments and negative comments.

11. An information processing method by an information processing device including circuitry, the method comprising:
- collecting, by the circuitry, comments on a submission target that progresses with a passage of time;
- selecting, by the circuitry, comments to be presented to a user from the collected comments based on characteristics of the user, wherein:
- the characteristics of the user include at least one of a feature amount of comments by the user and a feature amount of comments to which the user has given affirmative evaluations;
- the feature amount of comments is represented as a comment feature amount vector;
- each of the collected comments has a corresponding comment feature amount vector; and
- the feature amount of comments includes at least two of a feature amount of a writing style, phrases that appear, a frequency with which each phrase appears, and a result of categorizing into positive comments and negative comments;
- controlling, by the circuitry, a display of the selected comments so that the user is able to give evaluations for the selected comments; and
- collecting, by the circuitry, the evaluations given by the user.

12. A non-transitory computer readable medium having a computer program recorded thereon, the computer program configured to perform a method when executed on a computer, the method comprising:
- collecting comments on a submission target that progresses with a passage of time;
- selecting comments to be presented to a user from the collected comments based on characteristics of the user, wherein:
- the characteristics of the user include at least one of a feature amount of comments by the user and a feature amount of comments to which the user has given affirmative evaluations;
- the feature amount of comments is represented as a comment feature amount vector;
- each of the collected comments has a corresponding comment feature amount vector; and
- the feature amount of comments includes at least two of a feature amount of a writing style, phrases that appear, a frequency with which each phrase appears, and a result of categorizing into positive comments and negative comments;
- controlling a display of the selected comments so that the user is able to give evaluations for the selected comments; and
- collecting the evaluations given by the user.

* * * * *